United States Patent
Shih

(10) Patent No.: US 6,740,372 B1
(45) Date of Patent: May 25, 2004

(54) SYNTHETIC PILLAR AND BOARD MADE RECYCLABLE MATERIALS

(76) Inventor: Hsiu-Sheng Shih, No.18, Pu Chiao Lane, Pu Lun Li Lu Kang Township, Chang Hua Hsien (TW)

( * ) Notice: Subject to any disclaimer, the term of this patent is extended or adjusted under 35 U.S.C. 154(b) by 0 days.

(21) Appl. No.: 10/174,564

(22) Filed: Jun. 19, 2002

(51) Int. Cl.[7] .............................. B27N 5/02; B32B 1/08; B65D 75/02

(52) U.S. Cl. ..................... 428/34.1; 428/34.2; 428/34.3; 428/36.9; 428/36.91; 162/147; 206/814

(58) Field of Search ................................ 428/34.2, 34.3, 428/34.1, 36.9, 36.91; 162/147; 297/1–463.2; 312/1–352; 84/DIG. 17; 52/720.1–740.9; 108/1–161; 206/814

(56) References Cited

U.S. PATENT DOCUMENTS

| | | | | |
|---|---|---|---|---|
| 4,308,032 A | * | 12/1981 | Benson | 44/535 |
| 6,383,652 B1 | * | 5/2002 | Templeton et al. | 428/507 |
| 6,389,741 B2 | * | 5/2002 | Nimocks, III | 43/131 |
| 6,558,440 B1 | * | 5/2003 | Price, Jr. | 44/532 |
| 6,579,605 B2 | * | 6/2003 | Zehner | 428/319.9 |
| 2002/0026747 A1 | * | 3/2002 | Howe et al. | 47/48.5 |
| 2002/0094431 A1 | * | 7/2002 | Roderick et al. | 428/317.9 |
| 2003/0021915 A1 | * | 1/2003 | Rohatgi et al. | 428/15 |

* cited by examiner

Primary Examiner—Harold Pyon
Assistant Examiner—Chris Bruenjes
(74) Attorney, Agent, or Firm—Harrison & Egbert

(57) ABSTRACT

A pillar or board is formed of a casing, filling materials, and at least one plug. The casing is made of the discarded recyclable paper and is provided with at least one opening. The filling materials are sawdust and the discarded wood blocks, which are encased by the casing. The plug is made of the discarded recyclable paper and is used to stop up the opening of the casing.

5 Claims, 8 Drawing Sheets

SYNTHETIC PILLAR AND BOARD MADE RECYCLABLE MATERIALS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a synthetic pillar or board, and more particularly to a synthetic pillar or board made of recyclable materials.

BACKGROUND OF THE INVENTION

For the sake of conservation of natural resources, people are more inclined to make use of a product which is made of recyclable materials. In addition, such a synthetic product is generally cheaper than a comparable product which is made of a material of natural origin. For example, a wooden desk is generally more expensive than a comparable desk of synthetic materials. The conservation of timber is currently a global issue, not a regional issue. The present invention is therefore intended to address the issue.

BRIEF SUMMARY OF THE INVENTION

The primary objective of the present invention is to provide a synthetic pillar or board, which is made by putting together various recyclable elements.

The pillar or board of the present invention is formed of a casing and a plurality of filling materials. The casing is made of the discarded recyclable paper and is used to encase the filling materials, such as discarded wood pieces and sawdust. The casing has a cross section of circular, rectangular, or other geometric form. The casing further has at least one open end, which is provided with a plug made of the discarded recyclable paper.

Preferably, the casing is provided with a protective cover which is made of a reinforced paper with grainy texture, or iron sheet.

The pillar and the board of the present invention are used in making a variety of household products, such as table, rack, cabinet, etc.

The features and the functions of the present invention will be more readily understood upon a thoughtful deliberation of the following detailed description of the present invention with reference to the accompanying drawings.

DETAILED DESCRIPTION OF THE INVENTION

Figure 1:
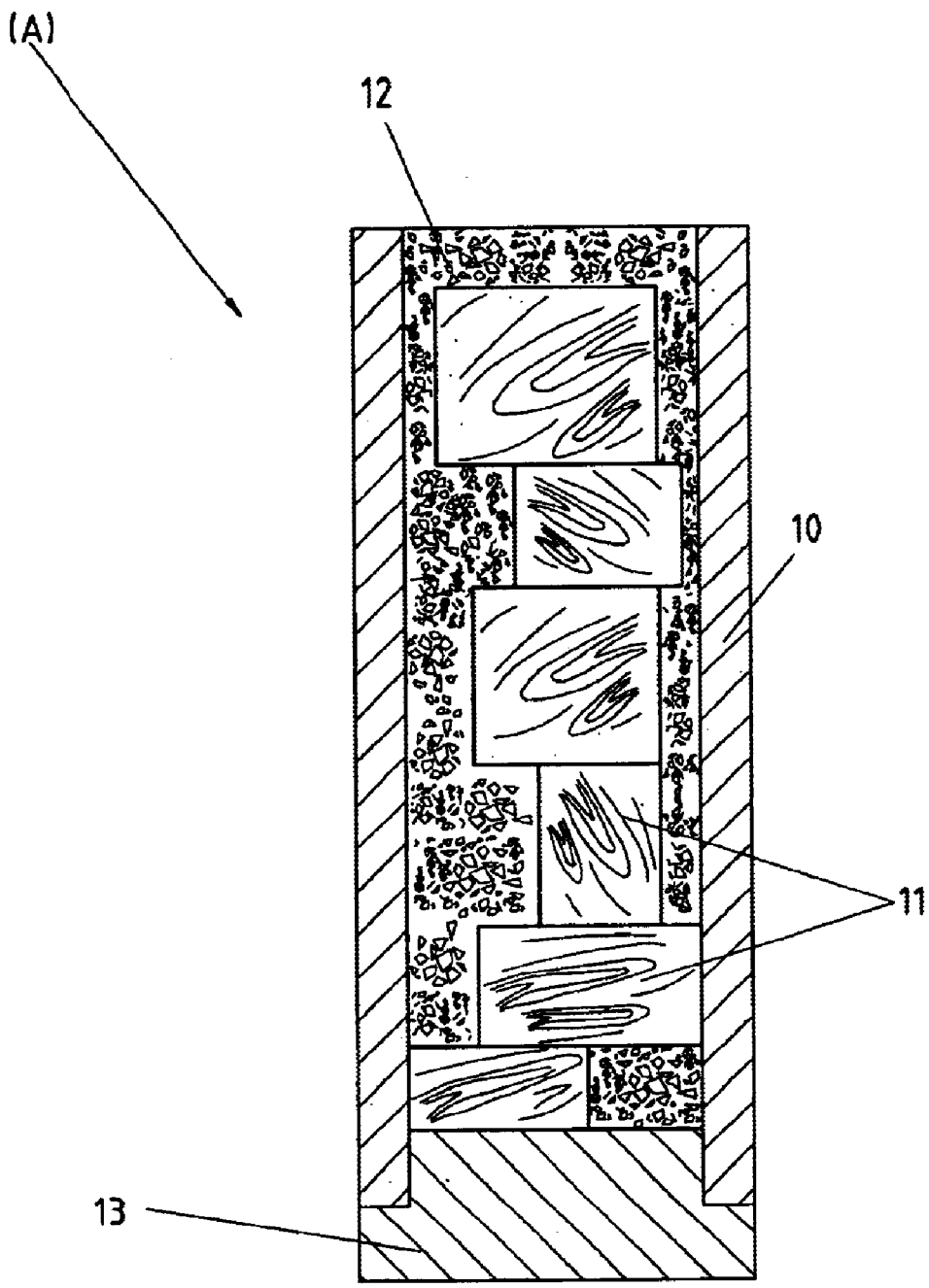
FIG. 1 shows a longitudinal sectional view of a pillar of the present invention.
Figure 2:
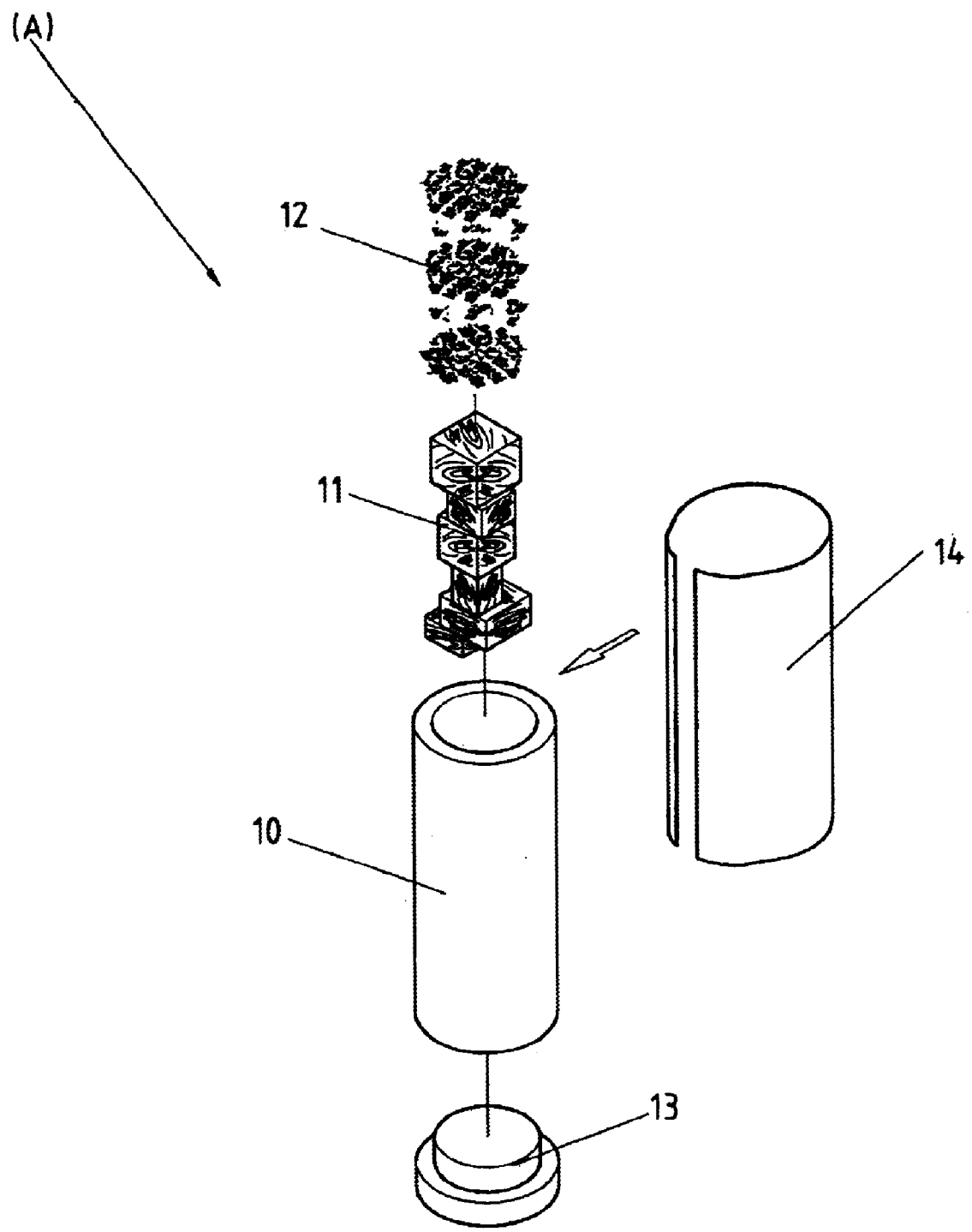
FIG. 2 shows an exploded perspective view of a pillar of the present invention.
Figure 5:
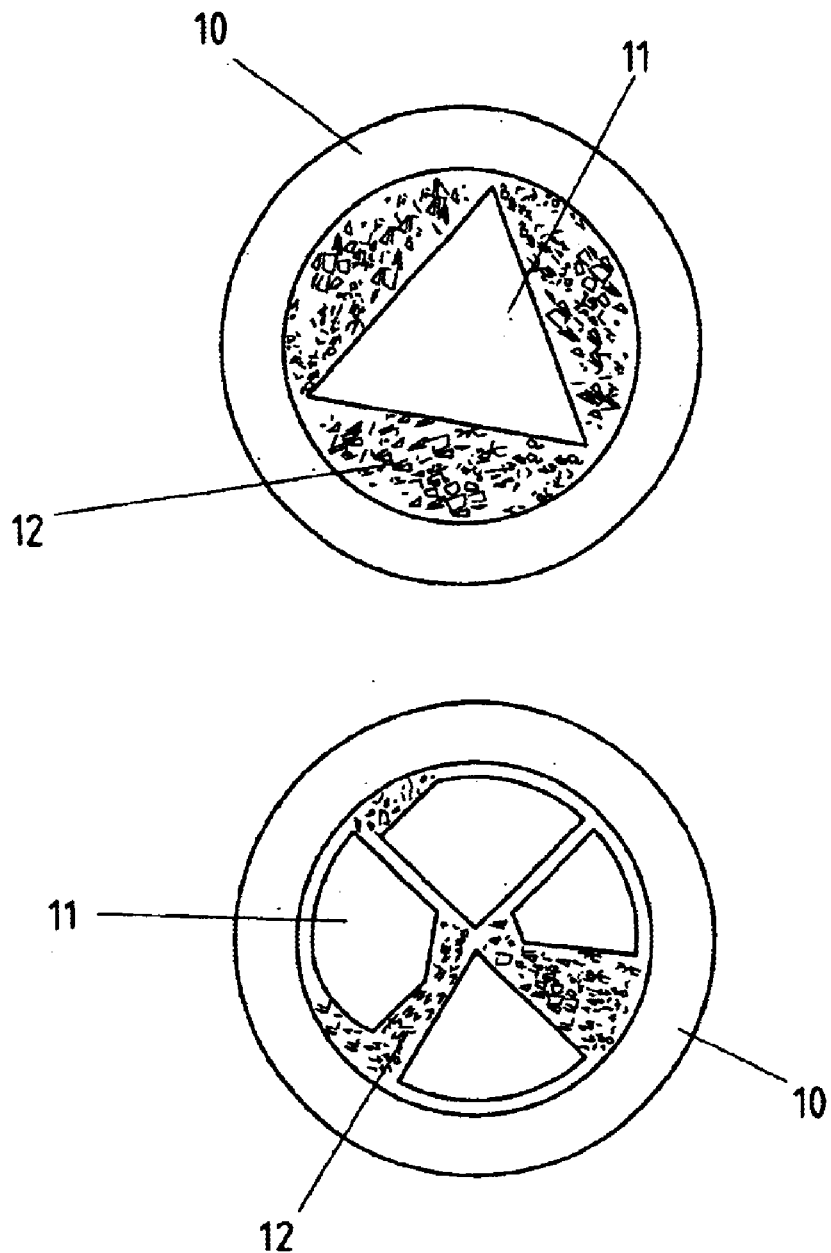
FIG. 5 shows two sectional views of arrangements of the filling materials of the present invention.

As shown in FIGS. 1,2 and 5, a pillar "A" of the present invention is formed of a casing 10, discarded wood pieces or blocks 11, sawdust 12, and two plugs 13.

The casing 10 is made of the discarded recyclable paper and is round in its cross section. The columnar casing 10 has two open ends, which are two longitudinal ends of the columnar casing 10. The casing 10 is used to encase the discarded wood blocks 11 and the sawdust 12, which serve to reinforce the structural strength of the casing 10. The two plugs 13 are made of the discarded recyclable paper and are used to stop up the two longitudinal ends of the casing 10.

Preferably, the casing 10 is provided with a protective cover 14, which is made of an iron sheet, or reinforced paper with grainy texture.

Figure 3:
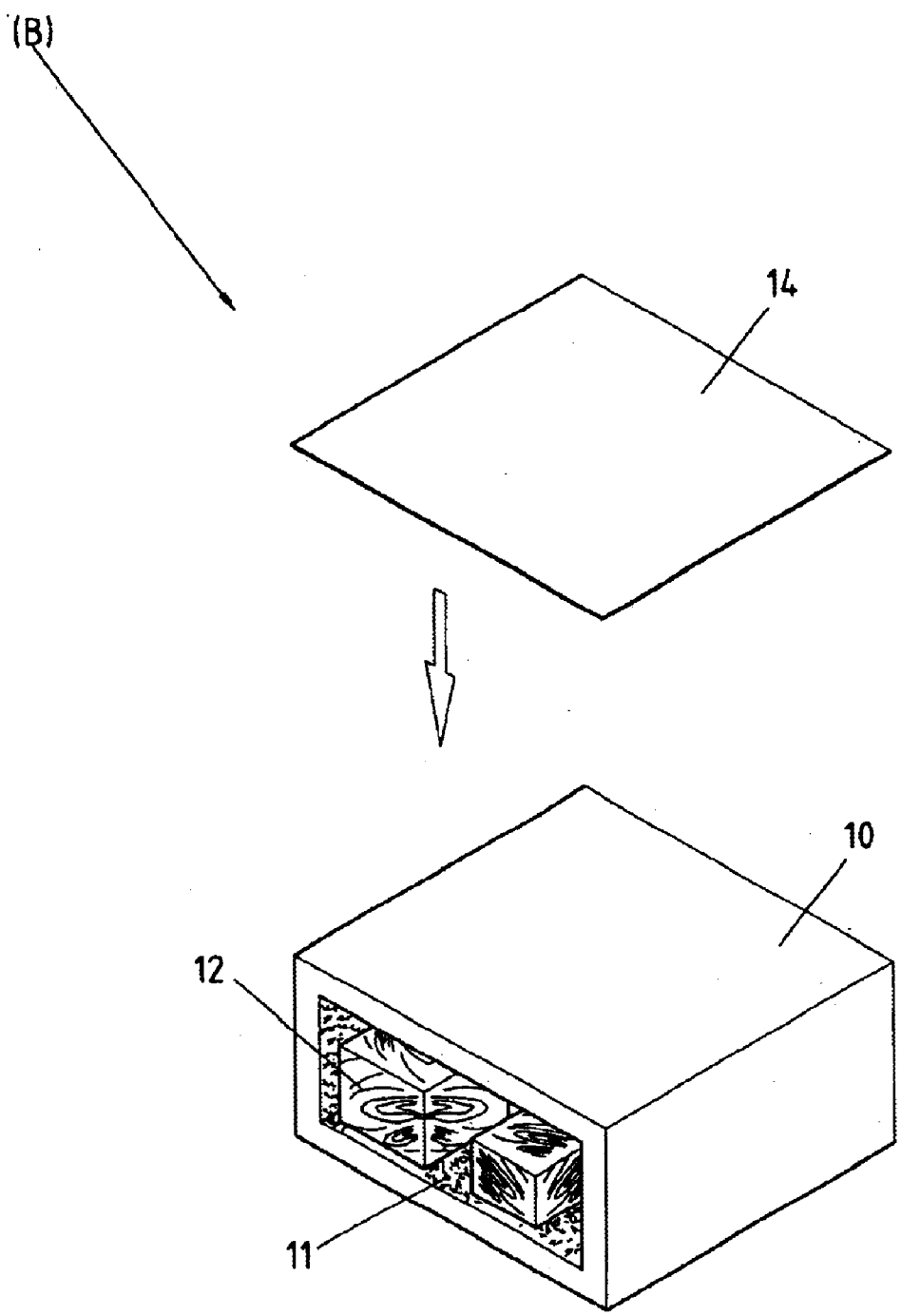
FIG. 3 shows a schematic view of a board of the present invention.
Figure 4:
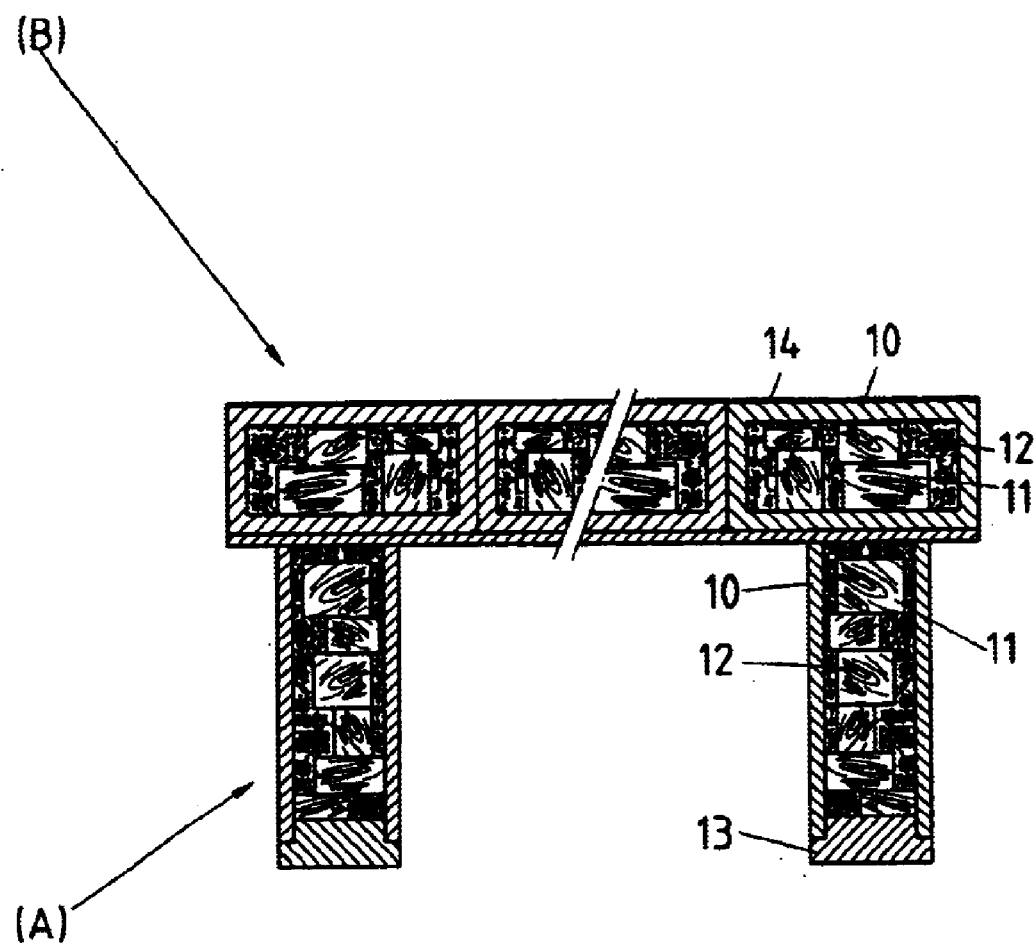
FIG. 4 shows a sectional view of, an article made of the pillars and the boards of the present invention.

As shown in FIG. 3, a board "B" of the present invention is formed of a casing 10, discarded wood pieces or blocks 11, sawdust 12, and two plugs (not shown in the drawing). The casing 10 is made of the discarded recyclable paper and is rectangular in its cross section. The casing 10 has two open ends which are the longitudinal ends of the casing 10. The casing 10 contains the discarded wood pieces or blocks 11 and sawdust 12, which serve to reinforce the structural strength of the casing 10. The two plugs are made of the discarded recyclable paper and are used to stop up the two longitudinal ends of the casing 10. The casing 10 is preferably provided with a protective cover 14, which is made of an iron sheet or reinforced paper with grainy texture.

Figure 6:
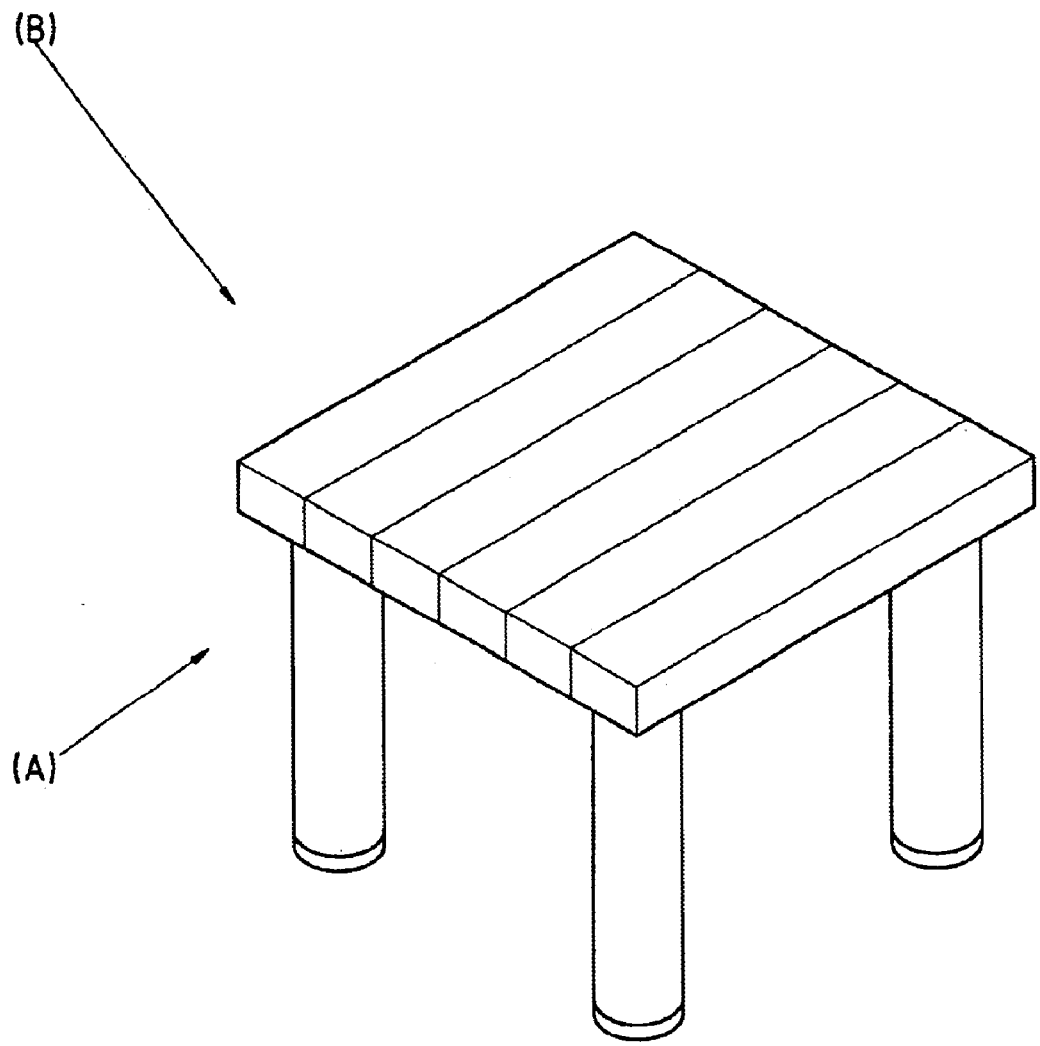
FIGS. 6–8 show perspective views of articles made of the pillars and the boards of the present invention.
Figure 7:
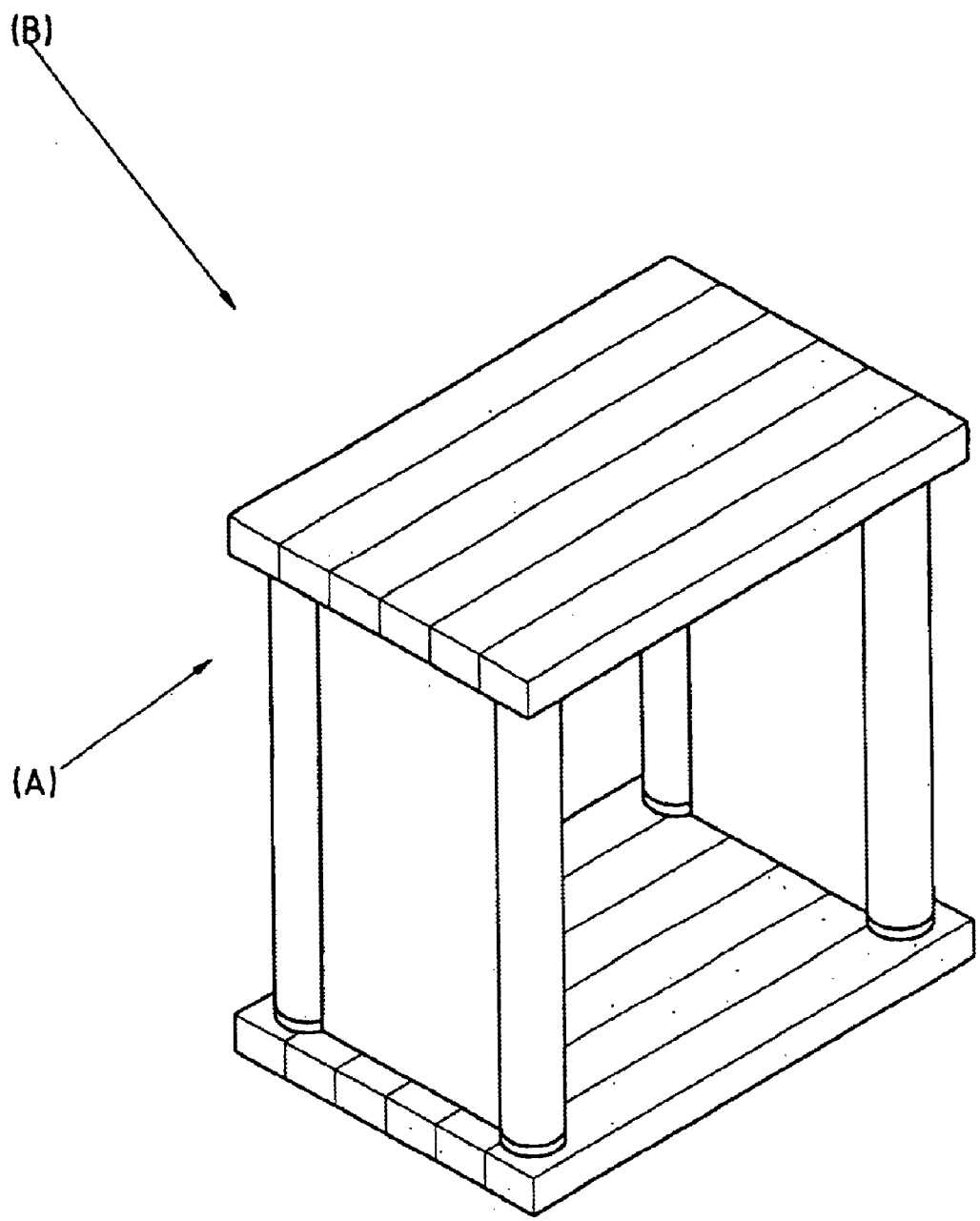
Figure 8:
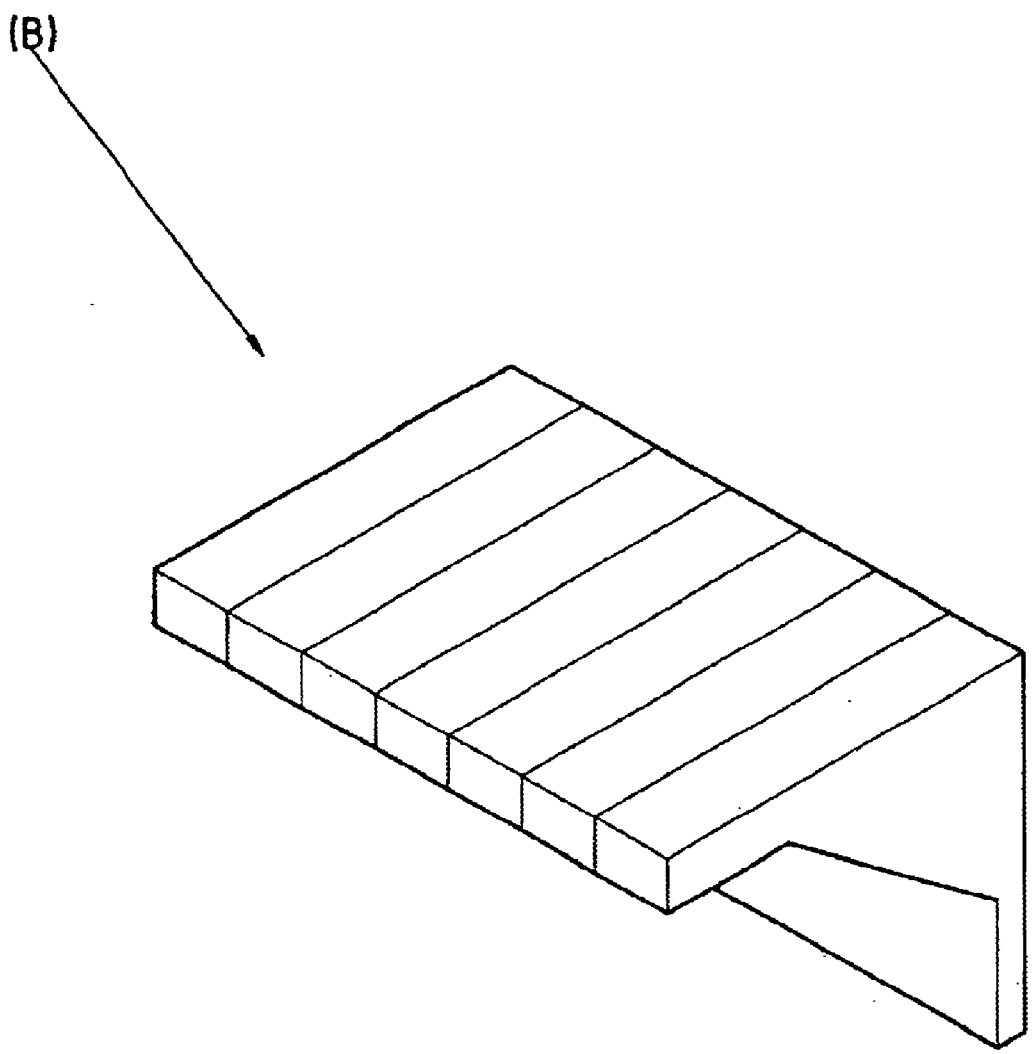

As illustrated in FIGS. 6–8, the pillars and the boards of the present invention are used to make up furniture.

The synthetic pillar and board of the present invention are simple in construction and cost-effective.

The present invention described above is to be regarded in all respects as being illustrative and nonrestrictive. Accordingly, the present invention may be embodied in other specific forms without deviating from the spirit thereof. The present invention is therefore to be limited only by the scope of the following claims.

I claim:

1. An object for use as a furniture component comprising:
   a casing having a cross section of a geometric form, said casing having a hollow interior and at least one opening at an end thereof;
   at least two filling materials encased within said hollow interior of said casing, one of the filling materials being sawdust, another of the filling materials being wood blocks each of substantially greater size than the sawdust; and
   at least one plug affixed over the opening of said casing so as to retain the filling materials within said hollow interior, said casing and the plug being formed of a paper material.

2. The object of claim 1, said cross section of said casing being round.

3. The object of claim 1, said cross section of said casing being rectangular.

4. The object of claim 1, further comprising:
   a protective cover affixed over an exterior surface of said casing.

5. The object of claim 4, said protective cover being of a paper material having a grainy texture.

* * * * *